United States Patent [19]

Uhrich

[11] Patent Number: 4,749,881
[45] Date of Patent: Jun. 7, 1988

[54] METHOD AND APPARATUS FOR RANDOMLY DELAYING A RESTART OF ELECTRICAL EQUIPMENT

[75] Inventor: Daniel T. Uhrich, Mayer, Minn.

[73] Assignee: Honeywell Inc., Minneapolis, Minn.

[21] Appl. No.: 52,804

[22] Filed: May 21, 1987

[51] Int. Cl.⁴ .................. G05D 23/00; F23N 5/20
[52] U.S. Cl. .................................... 307/41; 307/39;
     307/117; 307/141.4; 236/46 R; 236/46 F;
     62/158
[58] Field of Search .................. 307/34, 35, 37, 38,
     307/39, 40, 41, 115, 116, 117, 132 R, 132 E,
     141, 141.4; 361/28; 236/46 R, 46 F, 46 A, 46 E,
     46 C, 74 A, 78 B, 78 C, 78 D; 62/155-158, 168,
     182, 231, 227, 228.1

[56] References Cited

U.S. PATENT DOCUMENTS

| | | | |
|---|---|---|---|
| 4,020,358 | 4/1977 | Wyland | 307/39 |
| 4,045,973 | 9/1977 | Anderson et al. | 62/158 |
| 4,232,818 | 11/1980 | Christiansen | 236/46 R |
| 4,264,034 | 4/1981 | Hyltin et al. | 236/46 R |
| 4,333,002 | 6/1982 | Kozak | 307/40 X |
| 4,333,519 | 6/1982 | Shafrir et al. | 236/46 F X |
| 4,335,320 | 6/1982 | Garver | 307/39 |
| 4,388,692 | 6/1983 | Jones et al. | 236/46 R X |
| 4,467,616 | 8/1984 | Kitauchi | 307/39 X |
| 4,470,541 | 9/1984 | Raleigh | 236/46 R X |
| 4,475,685 | 10/1984 | Grimado et al. | 236/46 R |
| 4,519,215 | 5/1985 | Barnett | 62/158 |

FOREIGN PATENT DOCUMENTS 0219345 12/1983 Japan .................................... 62/156

Primary Examiner—William M. Shoop, Jr.
Assistant Examiner—Paul Ip
Attorney, Agent, or Firm—Mitchell J. Halista; Albin Medved

[57] ABSTRACT

A method for randomly delaying a restart of electrical equipment following an availability of power for energizing the equipment includes the steps of measuring an environmental temperature, e.g., the room where the electrical equipment is located, converting a predetermined fractional portion of the value of the sensed temperature to a number and using the number following an availability of power for energizing the equipment after a time period having a duration restarting the equipment. An apparatus employing this method includes a restart control, a temperature sensor and an equipment start programmer responsive to the temperature sensor and connected to the restart control for producing a restart control energizing signal dependent on a predetermined fractional portion of the value of the sensed temperature.

9 Claims, 2 Drawing Sheets

4,749,881

METHOD AND APPARATUS FOR RANDOMLY DELAYING A RESTART OF ELECTRICAL EQUIPMENT

BACKGROUND OF THE INVENTION

1. Field of the Invention

The present invention relates to a method and apparatus for control of power demand. More specifically, the present invention is related to a method and apparatus for randomly controlling the restart of electrical equipment.

SUMMARY OF THE INVENTION

An object of the present invention is to provide an improved method and apparatus for randomly controlling a restart of electrical equipment.

In accomplishing this and other objects, there has been provided, in accordance with the present invention, a method for randomly controlling a restart of electrical equipment following an availability of power for energizing the equipment includes the steps of measuring a preselected environmental temperature, converting a predetermined fractional portion of the sensed temperature to a number and using the number to set a timer to operate during a time period having a duration corresponding to the number and generating an energizing signal for the electrical equipment upon the expiration of an operation of the timer from the set condition at the end of the time period. An apparatus employing this method includes a restart control for the electrical equipment, a temperature sensor and an equipment start programmer responsive to the temperature sensor and connected to the restart control for producing a restart control energizing signal following an availability of power for energizing the equipment after a time period having a duration; dependent on the predetermined portion of the value of the sensed temperature.

BRIEF DESCRIPTION OF THE DRAWINGS

A better understanding of the present invention may be had when the following description is read in connection with the accompanying drawings, in which.

DESCRIPTION OF THE PREFERRED EMBODIMENT

Figure 1:
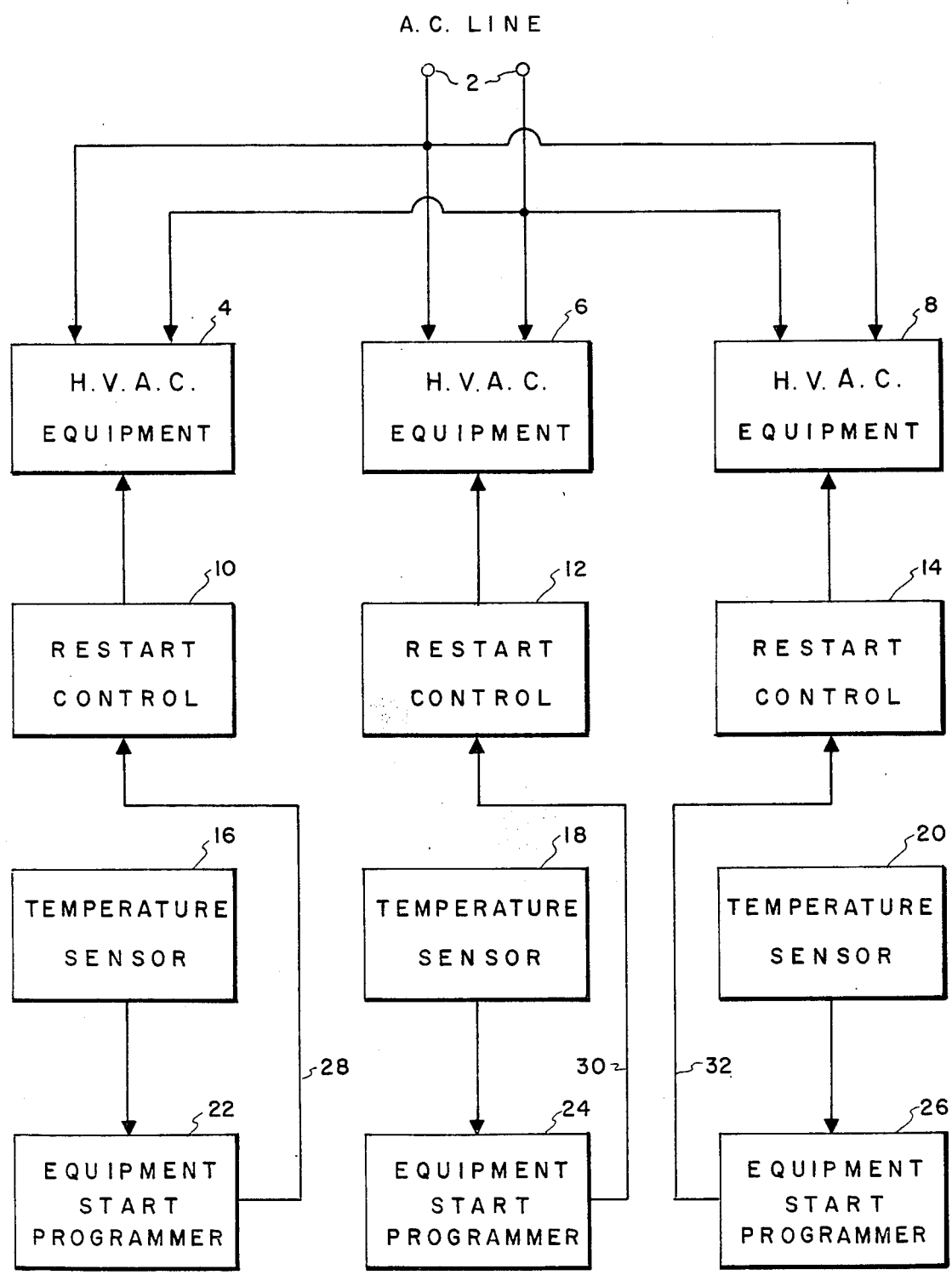
FIG. 1 is a block diagram of the system utilizing the method of the present invention for controlling the restart of electrical equipment and FIG. 2 is a flow chart of the operation of the method of the present invention.

Referring to FIG. 1 in more detail, there is shown a pair of power supply lines 2 for connection to a source of alternating current (AC) power. The AC line 2 is connected to supply power to a plurality of electrical equipment, especially those utilizing electrical motors which produce a high initial input power surge upon a restart of the motor, e.g., compressor motors used in heating, ventilating and air-conditioning (HVAC) equipment 4, 6 and 8. Each of the HVAC systems 4, 6 and 8 is connected to respective ones of a plurality of restart controls 10, 12 and 14. A temperature sensor is located in a corresponding environment, e.g., a room containing a respective one of each of the HVAC equipment systems. Thus, a first temperature sensor 16 may be arranged to measure the temperature of the environment of a first HVAC equipment 4; a second temperature sensor 18 measures the enviroment temperature of a second HVAC equipment 6 and a third temperature sensor 20 measures the environment temperature of a third HVAC equipment 8. The output signal from each of the temperature sensors 16, 18 and 20 is connected to a respective one of a plurality of equipment start programmers 22, 24 and 26. Each of the programmers 22, 24 and 26 may include a microprocessor having a stored program in a manner well-known in the art for controlling a sequence of operations controlled by an output from the microprocessor. The output from the programmers 22, 24 and 26 is connected to provide an energizing signal to a respective ones of the restart controls 10, 12 and 14. Thus, a first programmer 22 is arranged to energize the first restart control 10; a second programmer 24 is arranged to energize a second restart control 12 and a third programmer 26 is arranged to energize a third restart control 14.

The method used by the apparatus is based on the generation of a random number to avoid a simultaneous restart of all the HVAC equipment 4, 6 and 8 following an AC power outage. Thus, when the AC power is restored, all of the HVAC equipment 4, 6 and 8 would ordinarily attempt a simultaneous restart. This would result in a large power surge as all of the motors are started together. It is preferable to delay the restart of some of the HVAC equipment to reallocate the initial power requirement over a time period, e.g., several seconds. However, since each HVAC equipment 4, 6 and 8 is controlled by its own thermostat, the restart operation would not be ordinarily delayed, and, in the worse case, all the microprocessors associated with the thermostats would be starting the HVAC equipment at the same time.

While the microprocessors have no means of generating a random delay internally, the method of the present invention is directed to a means for generating the random delay by converting the value of a predetermined portion of the sensed temperature to a restart control signal, e.g., an integer from the range 0-15, which is then used to set a timer for controlling the restart of the HVAC equipment 4, 6 and 8. In a specific embodiment, a microprocessor controlled thermostat is used to provide an analog-to-digital (A/D) conversion of the sensed temperature. Using a four bit microprocessor, the internal representation of the temperature is structured in twelve bits with the last four bits representing sixteenths of a degree. This four bit value can be accessed directly and used as an integer with a value of 0 to 15. Other combinations of microprocessor word length and temperature measurement accuracy can be employed without departing from the scope of the present invention. A timer which may be in the microprocessor is set to a count level by the four bit digital integer value and allowed to count down by counting a clock signal in the microprocessor. The use of A/D converters, the setting of timers and the counting of clock signals by timers from a preset count level is also well-known in the art, and a further discussion thereof is believed to be unnessessary for a complete understanding of the present invention. The variability of the fractional part of the temperature in individual environments sensed by the temperature sensors 16, 18, 20 will provide a number which is sufficiently random to greatly minimize the possibility of a simultaneous restart of the HVAC equipment 4, 6 and 8.

Figure 2:
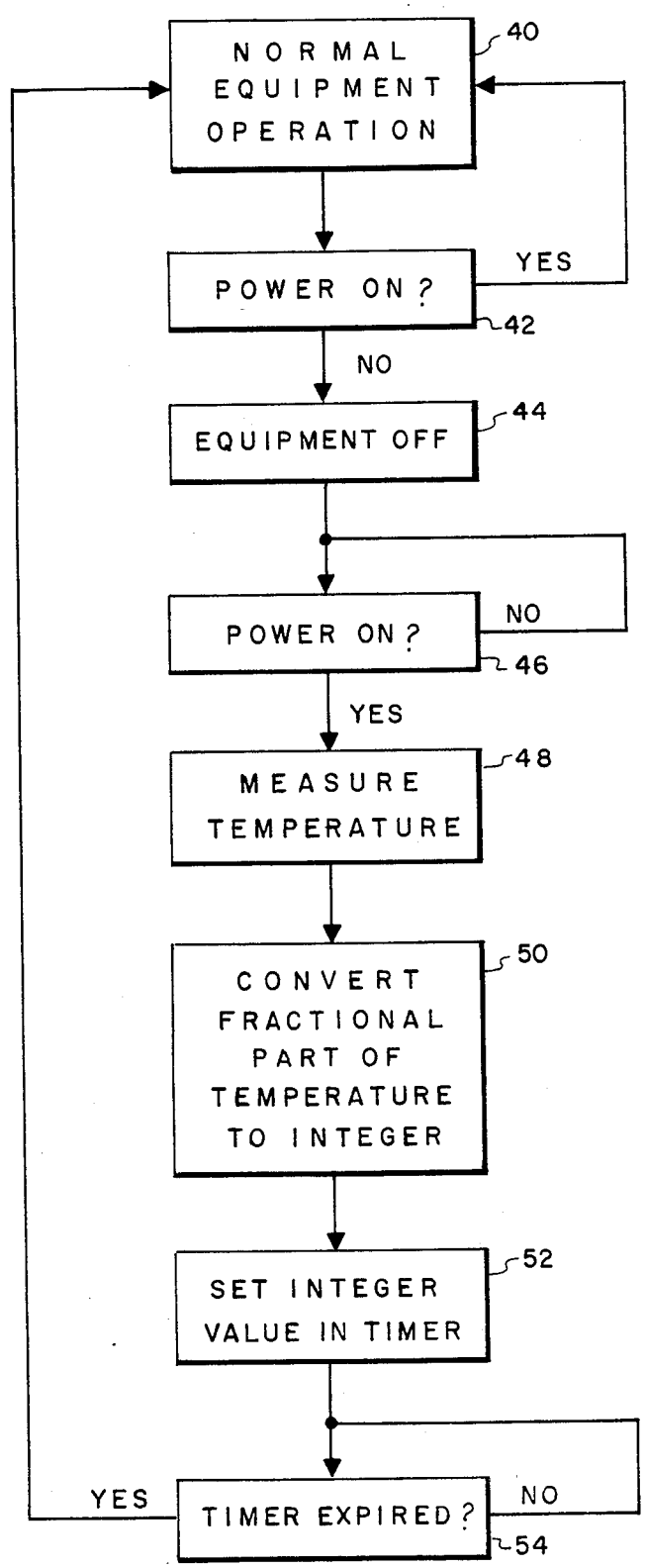

In FIG. 2, there is shown a flow chart of a program suitable for implementing the method of the present invention wherein the various steps 40 through 54 are used by the microprocessors in each of the start programmers 22, 24 and 26 to control the operation of the HVAC equipment 4, 6 and 8. Such a logic progression involves the sensing of a power outage and converting a predetermined portion of the temperature measured by the temperature sensors 16, 18 and 20 to a integer representing the fractional part of the temperature being measured and using the integer value to set a count level in a timer. Upon the expiration of the operation of the timer, e.g., a countdown to zero, a control signal is generated by the programmers 22, 24 and 26 to energize their respective restart controls 10, 12 and 14. Since each of the temperature sensors 16, 18 and 20 is arranged to sense the temperature of their respective environments, e.g., rooms housing respective ones of the HVAC equipment 4, 6 and 8, the fractional part of the temperature would be sufficiently variable to produce a variation in the integer used to set a respective one of the timers in the programmers 22, 24 and 26. Thus, the expiration of a respective countdown of the timers in the programmers 22, 24 and 26 would generate an energizing signal for a respective one of the restart controls 10, 12 and 14 which would be displaced in time from the energizing signal occurrence for the other ones of the restart controls 10, 12 and 14 to avoid a simultaneous restart attempt by all the HVAC equipment 4, 6 and 8.

Accordingly, there has been provided, in accordance with the present invention an improved method and apparatus for randomly delaying the restart of electrical equipment.

The embodiments of the present invention in which an exclusive property or privilege is claimed are defined as follows:

I claim:

1. A method of randomly controlling a restart of electrical equipment following an availability of power for energizing the equipment including the steps of measuring the temperature of a preselected environment, converting a predetermined fractional portion of the value of the measured temperature to a integer, utilizing the integer to set a timer to operate during a time period having a duration corresponding to the integer, and generating an energizing signal for the electrical equipment upon the expiration of an operation of the timer from the set condition at the end of the time period.

2. A method as set forth in claim 1 wherein the preselected environment is an interior of an enclosure containing the electrical equipment.

3. A method set forth in claim 1 wherein converting of a predetermined portion includes an analog-to-digital conversion of the measured temperature to a corresponding digital word and utilizing the integer includes selecting the least significant bits of the digital word from the conversion to set a count in the timer and allowing the timer to count clock signals to countdown from the count to a zero count to define the timer period representing an expiration of the operation of the timer from the set count condition.

4. An apparatus for randomly restarting electrical equipment following an availability of electrical power for energizing the equipment comprising
a restart control for the equipment,
a temperature sensor and
an equipment start programmer means responsive to said temperature sensor and connected to said restart control for producing a restart control energizing signal after a time period having a duration dependent on a predetermined fractional portion of the value of the sensed temperature.

5. An apparatus as set forth in claim 4 wherein said equipment start programmer includes an analog-to-digital converter means for converting a temperature representative signal from said sensor to a digital word, a clock signal source, a timer counter arranged to count clock signals from said source and to produce the energizing signal upon the expiration of a count operation from a preset count state and means for presetting a count in said counter representative of the least significant bits in said digital word.

6. An apparatus as set forth in claim 5 wherein said sensor is arranged to measure an environmental temperature of the electrical equipment.

7. An apparatus for randomly restarting each of a plurality of electrical equipment supplied with power from a common power input comprising
a separate restart control for each of the plurality of electrical equipment,
a plurality of temperature sensors with each of said sensors measuring a temperature of a preselected environment and
a plurality of equipment start programmer means with each of said programmer means being responsive to a respective one of said sensors and connected to a respective one of said restart controls for producing a restart control energizing signal dependent on a predetermined portion of the value of the temperature sensed by a respective one of said sensors.

8. An apparatus as set forth in claim 7 wherein each of said programmer means includes an analog-to-digital converter means for converting a temperature representative signal from the respective one of said sensors to a digital word, a clock signal source, a timer counter arranged to count clock signals from said source and to produce the energizing signal upon the expiration of a count operation from a preset count state and means for presetting a count in said counter representative of the least significant bits in said digital word.

9. An apparatus as set forth in claim 7 wherein each of said sensors is arranged to measure an environmental temperature of a corresponding one of the plurality of electrical equipment.

* * * * *